UNITED STATES PATENT OFFICE.

MORDKO HERSCHKOWITSCH, OF JENA, GERMANY, ASSIGNOR TO THE FIRM OF CARL ZEISS, OF JENA, GERMANY.

OXYGEN-GENERATING COMPOSITION.

1,027,333.  Specification of Letters Patent.  Patented May 21, 1912.

No Drawing.  Application filed July 20, 1910. Serial No. 572,942.

*To all whom it may concern:*

Be it known that I, MORDKO HERSCHKOWITSCH, a citizen of the German Empire, residing at Carl-Zeiss strasse, Jena, in the Grand Duchy of Saxe-Weimar, Germany, have invented a new and useful Oxygen-Generating Composition, of which the following is a specification.

The invention relates to an improvement in compositions, which generate oxygen when heated, as they contain as principal ingredient a chlorate or perchlorate or a similar highly oxygenated salt, which when heated liberates free oxygen or several such, and which by means of their secondary ingredients spontaneously complete the decomposition of the said salt, after it has been started locally by heating. The secondary ingredients produce this effect mainly by supplying heat to the principal ingredient, one of them at least being an oxidable substance. Compositions of this kind are disclosed in the Patent 874,596 and may be technically utilized in accordance with this patent.

The object of the invention is to lower the temperature of decomposition of the principal ingredient considerably below its temperature of fusion. Such lowering becomes possible, when there is included among the secondary ingredients a small quantity of a substance, which decomposes when heated, before the temperature of fusion of the principal ingredient is reached, and which generates a gas during its decomposition. This gas then acts as a powerful catalyte upon the principal ingredient of the composition.

To the substances having the property indicated above belong certain metallic salts, *e. g.* oxalates, those of iron, of nickel and of zinc, also carbonates of nickel, copper and iron. Carbonates form, as is well-known, as a gaseous product of decomposition carbon dioxid, oxalates form in addition to this also carbonic oxid.

A composition according to the present invention with the use of oxalate of iron may for example be composed of the following ingredients:

Potassium chlorate 75 to 90 parts by weight.
Peroxid of iron (or manganese dioxid) 10 " 20 " " "
Powdered iron 5 " 10 " " "
Oxalate of iron $\frac{1}{2}$ " 2 " " "

Peroxid of iron (manganese dioxid) can be entirely dispensed with, if the quantity of oxalate be increased, say doubled. Similarly with the use of carbonate of nickel, even without peroxid of iron, a useful composition is obtained, *e. g.* by using the following ingredients:

Potassium chlorate 75 to 90 parts by weight.
Powdered iron 5 " 10 " " "
Carbonate of nickel 2 " 5 " " "

I claim:

1. Composition generating oxygen when heated, consisting of a highly oxygenated salt, which when heated liberates free oxygen and a number of secondary ingredients suitable to continue the decomposition of the said salt, after this decomposition has been started by local heating, among the said secondary ingredients being at least one oxidable substance and a small quantity of a metallic salt, which decomposes, generating gas, when heated to near the temperature of fusion of the said oxygenated salt.

2. Composition generating oxygen when heated, consisting of a highly oxygenated salt, which when heated liberates free oxygen and a number of secondary ingredients suitable to continue the decomposition of the said salt, after this decomposition has been started by local heating, among the said secondary ingredients being at least one oxidable substance and a small quantity of an oxalate.

MORDKO HERSCHKOWITSCH.

Witnesses:
 PAUL KRÜGER,
 ALFRED MACKEDANZ.